(No Model.)
W. L. SHOCKLEY.
CAR FENDER.
No. 526,949. Patented Oct. 2, 1894.
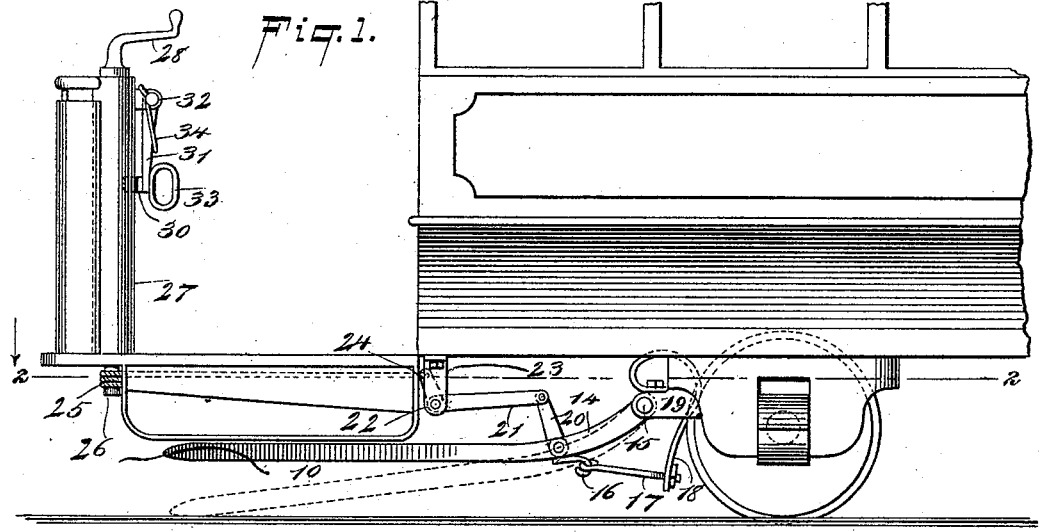
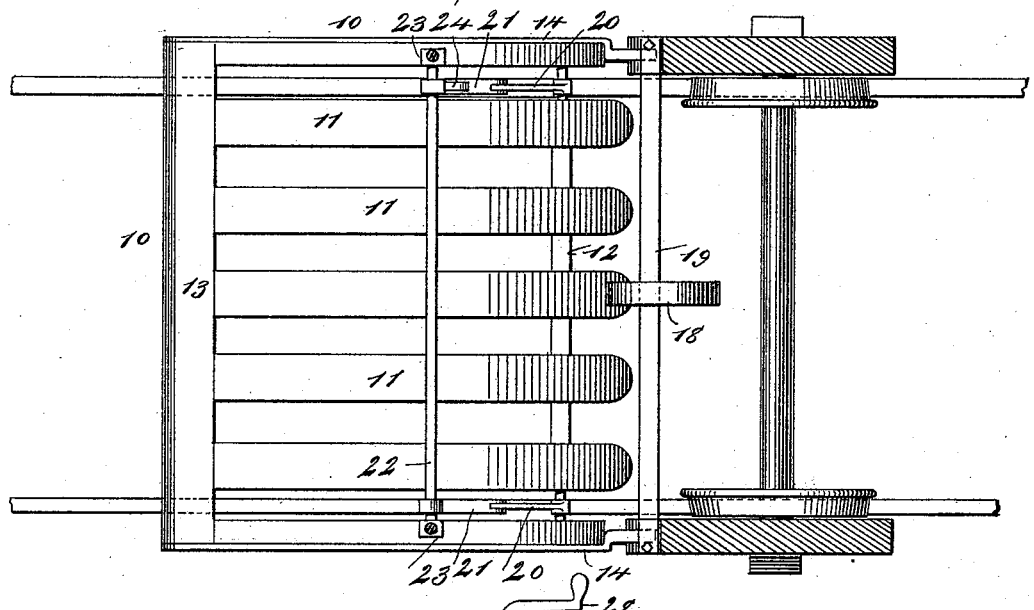
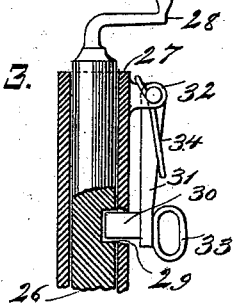
WITNESSES:
William Goebel.
C. Sedgwick
INVENTOR
W. L. Shockley
BY
Munn & Co
ATTORNEYS.

UNITED STATES PATENT OFFICE.

WILLIAM L. SHOCKLEY, OF COLORADO SPRINGS, COLORADO.

CAR-FENDER.

SPECIFICATION forming part of Letters Patent No. 526,949, dated October 2, 1894.

Application filed December 20, 1893. Serial No. 494,153. (No model.)

*To all whom it may concern:*

Be it known that I, WILLIAM L. SHOCKLEY, of Colorado Springs, in the county of El Paso and State of Colorado, have invented a new and Improved Car-Fender, of which the following is a full, clear, and exact description.

My invention relates to improvements in that class of car fenders which are used on street cars to prevent people from being caught beneath the cars and crushed by the wheels.

The object of my invention is to produce a very simple and inexpensive fender of this class, which may be conveniently applied to a car of any ordinary construction, which may be normally held upward so as to pass freely over any ordinary obstruction on the track, which, however, may be instantly released and caused to spring downward into close contact with the track so as to catch any person or thing thereon, and which may be adjusted and held at any desired height, so that if the track is covered with snow the free end of the fender may be lifted to ride over the snow.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of my improved device as applied to a car, the fender being shown in a raised position. Fig. 2 is a sectional plan on the line 2—2 of Fig. 1; and Fig. 3 is a detail sectional view of the main crank shaft and the means for locking it.

The fender 10 may be of any approved construction, but is preferably made as illustrated, that is, with parallel bars 11 forming its body portion, a cross bar 12 near the inner and upper ends of the bars, and a cross bar 13 at the free end of the fender, this cross bar being beveled, as shown so that it may lie flat on the track and readily scoop up any obstruction. The fender 10 has side straps 14 which project from one end of the fender, and these bars are hinged, as shown at 15, to the end of the car truck, but the fender may be hung on any convenient support.

A hook 16 is attached to the under side of the cross bar 12 and extends rearwardly, as shown in Fig. 1, and connects by means of an eye bolt 17 or equivalent device with the free end of a bent spring 18 which extends upward over the cross bar 19 on the car truck and is firmly secured to the cross bar. The tension of the spring 18 is such as to normally hold the free end of the fender upon the track, but the following means is employed for lifting the fender and for holding it at any necessary height.

Extending upward from the cross bar 12 is an arm 20, which connects with a crank arm 21 on a rock shaft 22 which extends transversely above the fender, turning in hangers 23, and the rock shaft is provided on its upper side with a crank 24 to which is secured a cable 25, and this extends forward beneath the car platform and is attached to the lower end of a vertical shaft 26 which turns in a barrel 27 on the car platform and has at its upper end a crank handle 28 by which it may be turned.

It will be seen that by turning the shaft 26, the cable 25 may be wound thereon and the rock shaft 22 tilted, so as to lift the arm 21 and fender 10 against the tension of the spring 18. In the shaft 26 is a notch 29 registering with a similar notch in the barrel 27, and adapted to receive the bit 30 of a latch 31 which is hung on the barrel 27, and when the bit enters the notch the shaft 26, is prevented from turning, and in this way the fender may be held at any desired height. The drawings show but one notch in the shaft 26, but it will be understood that the said shaft may be provided with any necessary number of notches.

The latch 31 is pivoted in lugs 32 on the barrel, and is provided with a handle 33 by which it may be pulled out of engagement with the shaft 26, and whenever this is done the tension of the spring 18 causes the fender to be quickly pulled down, unwinding the cable 25 as it does so. The latch is pressed normally into engagement with the shaft 26 by a spring 34.

From the above description it will be seen that the fender may be at any time raised by simply turning the shaft 26, and by releasing said shaft the spring 18 quickly throws the fender down, so that even though the car is run very fast the fender may be lowered in time to catch a person.

Having thus described my invention, I claim as new and desire to secure by Letters Patent—

1. The combination, with a car, of a vertically-swinging spring-depressed fender hung beneath the car, a revoluble vertical shaft mounted on the car platform, and a cable and lever connection between said shaft and the fender, whereby the fender may be raised, substantially as described.

2. The combination, with a car, of a vertically swinging spring-depressed fender beneath it, a rock shaft journaled above the fender, a crank connection between the rock shaft and the fender, a revoluble vertical shaft mounted on the car platform, and a cable connection between the vertical shaft and the rock shaft, substantially as described.

3. The combination with a car, of a vertically swinging fender hung beneath the car, a spring secured at one end to a fixed support, the free end of said spring extending below the plane of the pivoted end of the fender, a connection between the free end of the spring and the under side of the fender at a point forward of its pivoted end, the tension of said spring normally holding the free end of the fender upon the track, and mechanism for lifting the fender against the tension of the spring, substantially as described.

4. The combination with a car, of a vertically swinging spring depressed fender hung beneath the car, a revoluble vertical shaft mounted on the car platform, a cable and lever connection between said shaft and the fender and a latch to lock the said shaft, substantially as described.

5. The combination, with the pivoted fender, the revoluble shaft for lifting the fender, the barrel for inclosing the said shaft, said barrel and shaft being notched, as specified, of a latch hung on the barrel and adapted to enter the notches in the barrel and shaft, substantially as described.

WILLIAM L. SHOCKLEY.

Witnesses:
   THOMAS S. MELDRIM,
   JOHN W. WALKER.